United States Patent
Wakahara et al.

(10) Patent No.: US 7,483,781 B2
(45) Date of Patent: Jan. 27, 2009

(54) ENGINE CONTROL APPARATUS

(75) Inventors: Keiji Wakahara, Inazawa (JP); Takeshi Fujimoto, Obu (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/929,293

(22) Filed: Oct. 30, 2007

(65) Prior Publication Data

US 2008/0110447 A1    May 15, 2008

(30) Foreign Application Priority Data

Nov. 10, 2006    (JP)    ............................. 2006-305612

(51) Int. Cl.
*B60T 7/12*    (2006.01)
*F02D 41/00*    (2006.01)

(52) U.S. Cl. ...................................... 701/103; 123/672

(58) Field of Classification Search ................. 701/101, 701/103, 104, 108, 109, 114, 115; 123/434, 123/672, 674
See application file for complete search history.

(56) References Cited

U.S. PATENT DOCUMENTS

| | | | |
|---|---|---|---|
| 5,542,404 A | | 8/1996 | Hasegawa et al. |
| 5,640,846 A | * | 6/1997 | Ohuchi et al. .................. 60/276 |
| 5,758,632 A | | 6/1998 | Yamashita et al. |
| 5,964,208 A | | 10/1999 | Yamashita et al. |
| 6,032,659 A | | 3/2000 | Yamashita et al. |
| 6,898,927 B2 | * | 5/2005 | Morinaga et al. ............. 60/284 |
| 7,040,085 B2 | * | 5/2006 | Namiki ........................ 60/277 |
| 2002/0026789 A1 | * | 3/2002 | Morinaga et al. ............. 60/277 |
| 2003/0070423 A1 | * | 4/2003 | Morinaga et al. ............. 60/284 |
| 2005/0161033 A1 | * | 7/2005 | Okamoto et al. ............ 123/673 |

* cited by examiner

*Primary Examiner*—John T Kwon
(74) *Attorney, Agent, or Firm*—Nixon & Vanderhye PC

(57) ABSTRACT

An engine control apparatus feedback-controls a mixture air-fuel ratio of air-fuel mixture supplied to each cylinder of the engine based on an exhaust air-fuel ratio detected by an air-fuel ratio sensor. The control apparatus further calculates an exhaust air-fuel ratio change rate at every predetermined interval and integrates an absolute value of the exhaust air-fuel ratio change rate. The control apparatus determines an abnormality in any one of engine cylinders when an integration value of the exhaust air-fuel ratio change rate exceeds a predetermined reference value.

9 Claims, 5 Drawing Sheets

ENGINE CONTROL APPARATUS

CROSS REFERENCE TO RELATED APPLICATION

This application is based on and incorporates herein by reference Japanese Patent Application No. 2006-305612 filed on Nov. 10, 2006.

FIELD OF THE INVENTION

The present invention relates to an engine control apparatus, which has a function of diagnosing abnormality in an air-fuel control system by using an output signal of an air-fuel ratio sensor for detecting air-fuel ratio in exhaust gas.

BACKGROUND OF THE INVENTION

In recent electronically-controlled engine control systems, a fuel injection quantity for each cylinder, i.e., an air-fuel ratio of air-fuel mixture supplied to an engine (mixture air-fuel ratio), is feedback-controlled based on an output signal of an air-fuel ratio sensor for detecting an air-fuel ratio of exhaust gas (exhaust air-fuel ratio) so that the exhaust air-fuel ratio is controlled to be within a predetermined air-fuel ratio range including the stoichiometric air-fuel ratio. In this range, an exhaust purifying catalyst can purify exhaust gas with a high purification rate. This type of air-fuel ratio control system has a function of diagnosing abnormality.

For instance, a system disclosed in JP 7-224709 A uses, as abnormality diagnosis data, individual air-fuel ratio feedback correction factors (coefficients) used for individually feedback-controlling mixture air-fuel ratio of multiple cylinders, and checks whether the individual feedback correction factors are within a predetermined range. If any one of the individual feedback correction factors is outside the predetermined range, a cylinder of the engine corresponding to such a feedback correction factor is determined to be abnormal. Since this control system requires the individual feedback correction factors for multiple cylinders as the abnormality diagnosis data, it is not possible to perform the above abnormality diagnosis in other control systems, which do not feedback-control the individual air-fuel ratios of multiple cylinders by calculating individual feedback correction factors.

SUMMARY OF THE INVENTION

It is therefore an object of the present invention to provide an engine control apparatus, which is capable of diagnosing abnormality in an engine equipped with any type of air-fuel ratio feedback control system whether the air-fuel ratio is individually feedback-controlled.

According to an aspect of the present invention, an engine control apparatus has an air-fuel ratio sensor that detects an exhaust air-fuel ratio of exhaust gas of an engine, and an electronic control unit that feedback-controls a mixture air-fuel ratio of air-fuel mixture supplied to each cylinder of the engine based on the exhaust air-fuel ratio. The electronic control unit calculates an exhaust air-fuel ratio change rate at every predetermined interval and integrates an absolute value of the exhaust air-fuel ratio change rate. The control unit further diagnoses whether an air-fuel ratio in any one of cylinders of the engine is abnormal based on an integration value of the exhaust air-fuel ratio change rate.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

Figure 1:
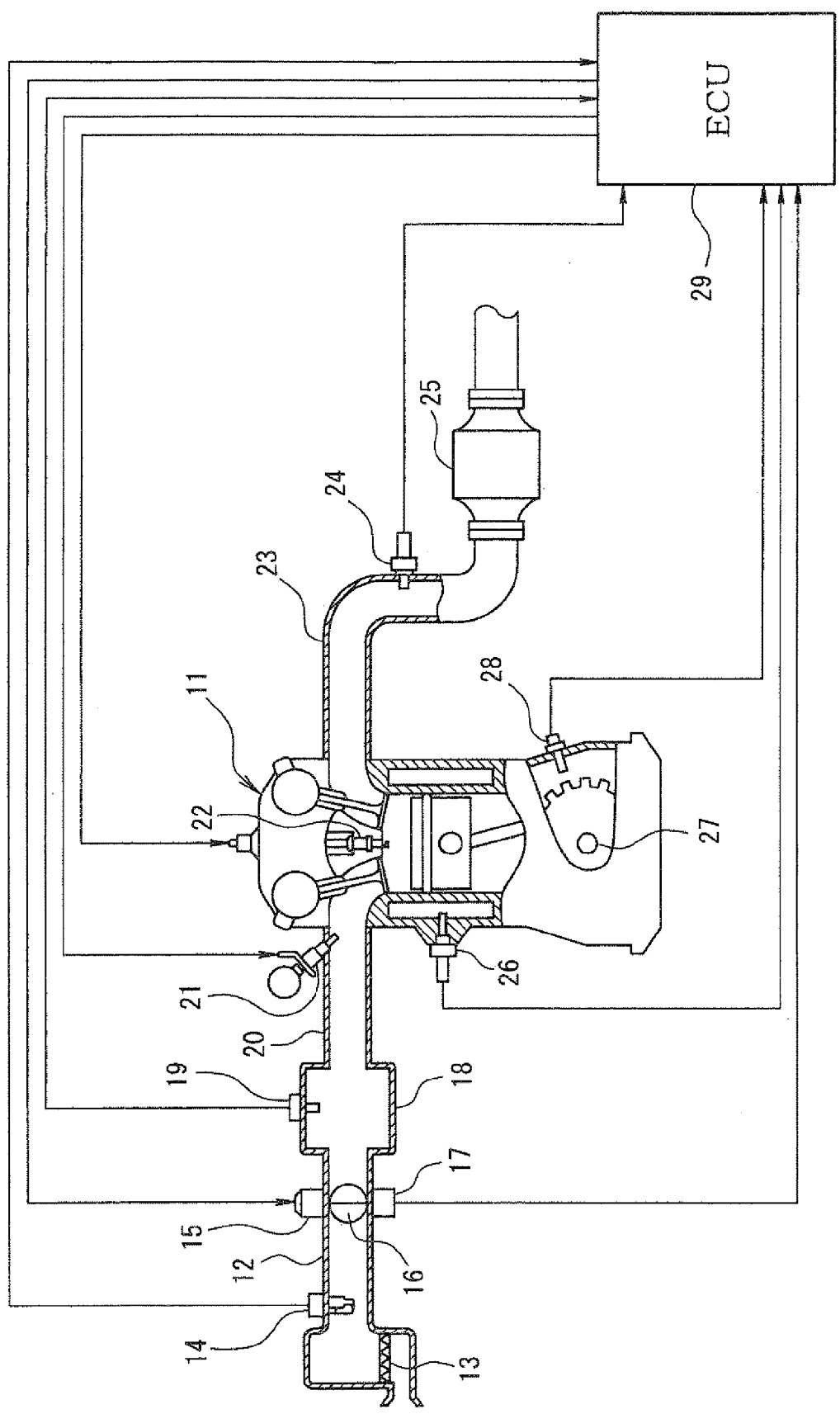
FIG. 1 is a schematic diagram showing an engine control system in a first embodiment of the present invention.

Referring first to FIG. 1, an internal combustion engine 11 has an intake pipe 12 and an exhaust pipe 23. An air cleaner 13 is provided at the most upstream position of the intake pipe 12. An airflow meter 14 for detecting an intake air quantity is provided downstream the air cleaner 13. A throttle valve 16 driven by a motor 15 and a throttle sensor 17 for detecting a throttle position are provided downstream the airflow meter 14. A surge tank 18 is provided downstream the throttle valve 16. A pressure sensor 19 for detecting an intake air pressure is provided in the surge tank 18. The surge tank 18 is coupled to intake manifolds 20, which respectively lead intake air into multiple cylinders of the engine 11.

Fuel injectors 21 are attached to the intake manifolds 20, respectively, so that each fuel injector 21 injects fuel near an intake port of each cylinder to supply air-fuel mixture into the cylinder. A spark plug 22 is attached to each cylinder head of the engine 11, so that it generates a spark discharge to ignite the air-fuel mixture in the cylinder.

In the exhaust pipe 23 coupled to the cylinders of the engine 11, an air-fuel ratio sensor 24 is provided for detecting air-fuel ratio in the exhaust gas (exhaust air-fuel ratio). Further, a three-way catalyst 25 for purifying the exhaust gas is provided downstream the air-fuel ratio sensor 24.

On the engine 11, a coolant temperature sensor 26 and a crankshaft angle sensor 28 are attached. The coolant temperature sensor 26 detects a coolant temperature. The crankshaft angle sensor 28 generates a pulse signal at every predetermined angular rotation of a crankshaft 27 of the engine 11, so that a crankshaft position and an engine rotation speed are determined based on the pulse signal.

These sensors 14, 17, 19 24, 26, 28 are connected to an electronic control unit (ECU) 29, which includes a microcomputer, a ROM, etc. The ECU 29, particularly the microcomputer, executes various engine control programs stored in the ROM and controls the fuel injection quantity of each fuel injector 21 and an ignition time of each ignition plug 22 based on engine operating conditions. In controlling the fuel injection quantity, the ECU 29 feedback-controls the fuel injection quantity (mixture air-fuel ratio) supplied to each cylinder based on an air-fuel ratio sensor signal of the air-fuel ratio sensor 24, so that the air-fuel ratio of the exhaust gas attains a target air-fuel ratio. As a result, the air-fuel ratio of the exhaust gas is thus controlled to be within a predetermined range including the stoichiometric ratio, the catalyst 25 purifies the exhaust gas with high purification rate.

The ECU 29 further check whether any one of individual air-fuel ratios of mixtures supplied to the multiple cylinders is abnormal. For this abnormality detection, a first-order difference (first-order derivative value) indicative of a change rate of an actual or detected air excess ratio λ corresponding to the air-fuel ratio sensor signal is calculated at every crankshaft angular rotation during engine operation, and an absolute value of this first-order difference is integrated. Then, the resultant integrated value in a predetermined period is compared with a predetermined reference value. Here, the air excess ratio λ is defined as the detected air-fuel ratio divided by the stoichiometric air-fuel ratio.

Figure 2:
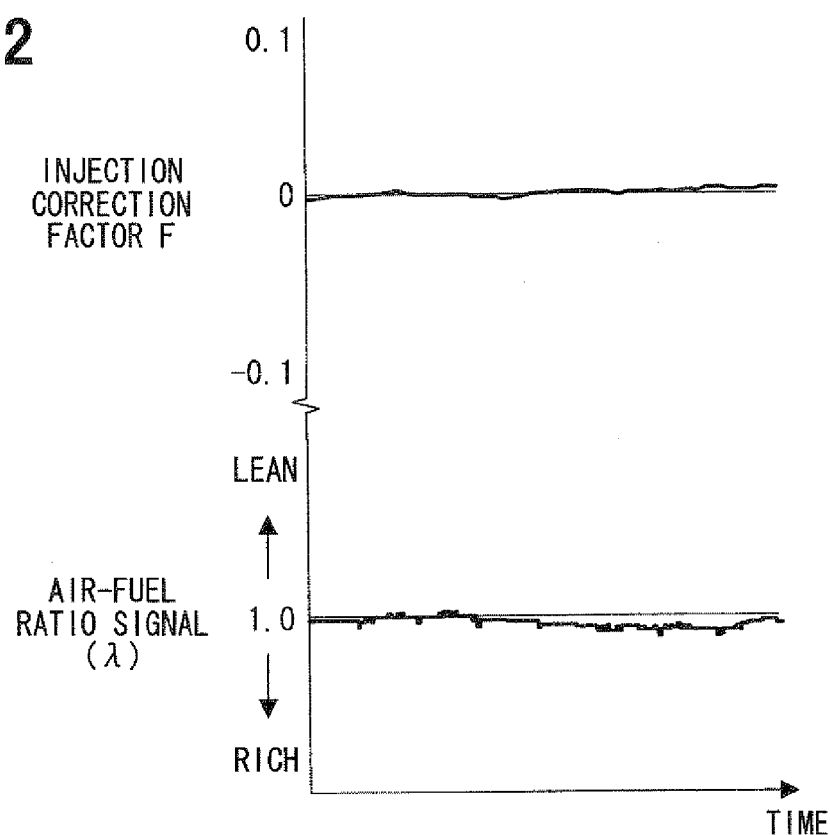
FIG. 2 is a time chart showing an injection correction factor change and an air-fuel ratio sensor signal change when no abnormality is present.
Figure 3:
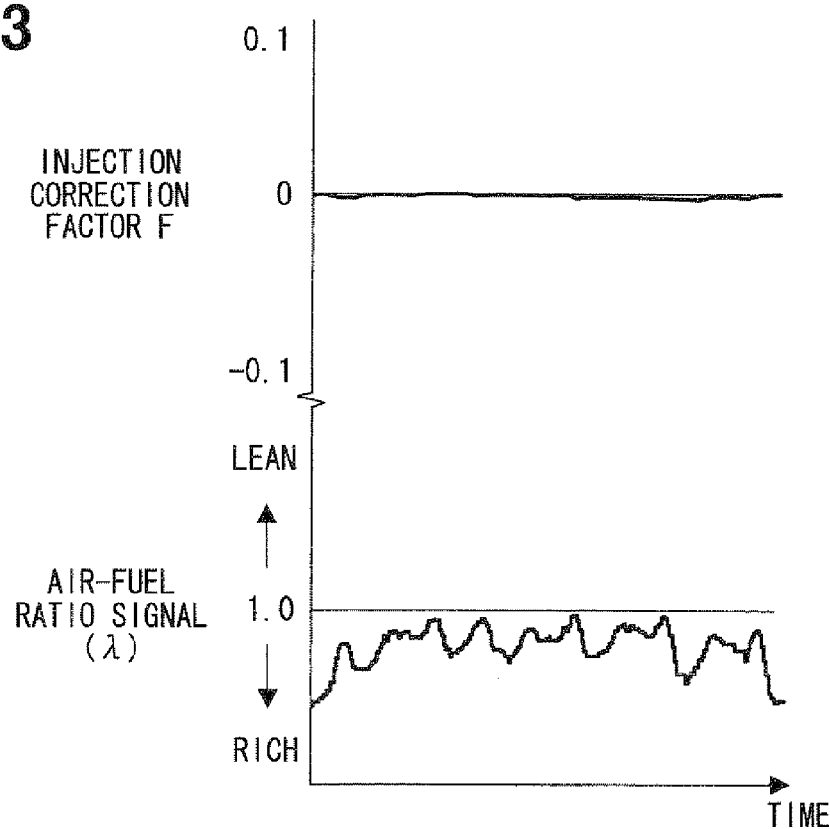
FIG. 3 is a time chart showing an injection correction factor change and an air-fuel ratio sensor signal change when a too-rich abnormality is present in a first cylinder.

As shown in FIG. 2, when the mixture air-fuel ratios among all the cylinders do not change, the fuel injection correction factor F for each cylinder is stable at around zero, and the exhaust air-fuel ratio does not change. As a result, the air excess ratio λ is also stable at around 1.0. When the mixture air-fuel ratio in any one of the cylinders, for instance in the first (#1) cylinder, the exhaust air-fuel ratio changes correspondingly. For instance, as shown in FIG. 3, the detected air excess ratio λ changes in the fuel-rich region (λ<1.0). As a result, since the integrated value of the first-order difference becomes large, the integrated value can be used as an index, which indicates a degree of deviation of the exhaust air-fuel ratio. Therefore, it is possible to check whether the air-fuel ratio is abnormal in any one of the multiple cylinders by comparing the integrated value with the predetermined reference value.

Figure 4:
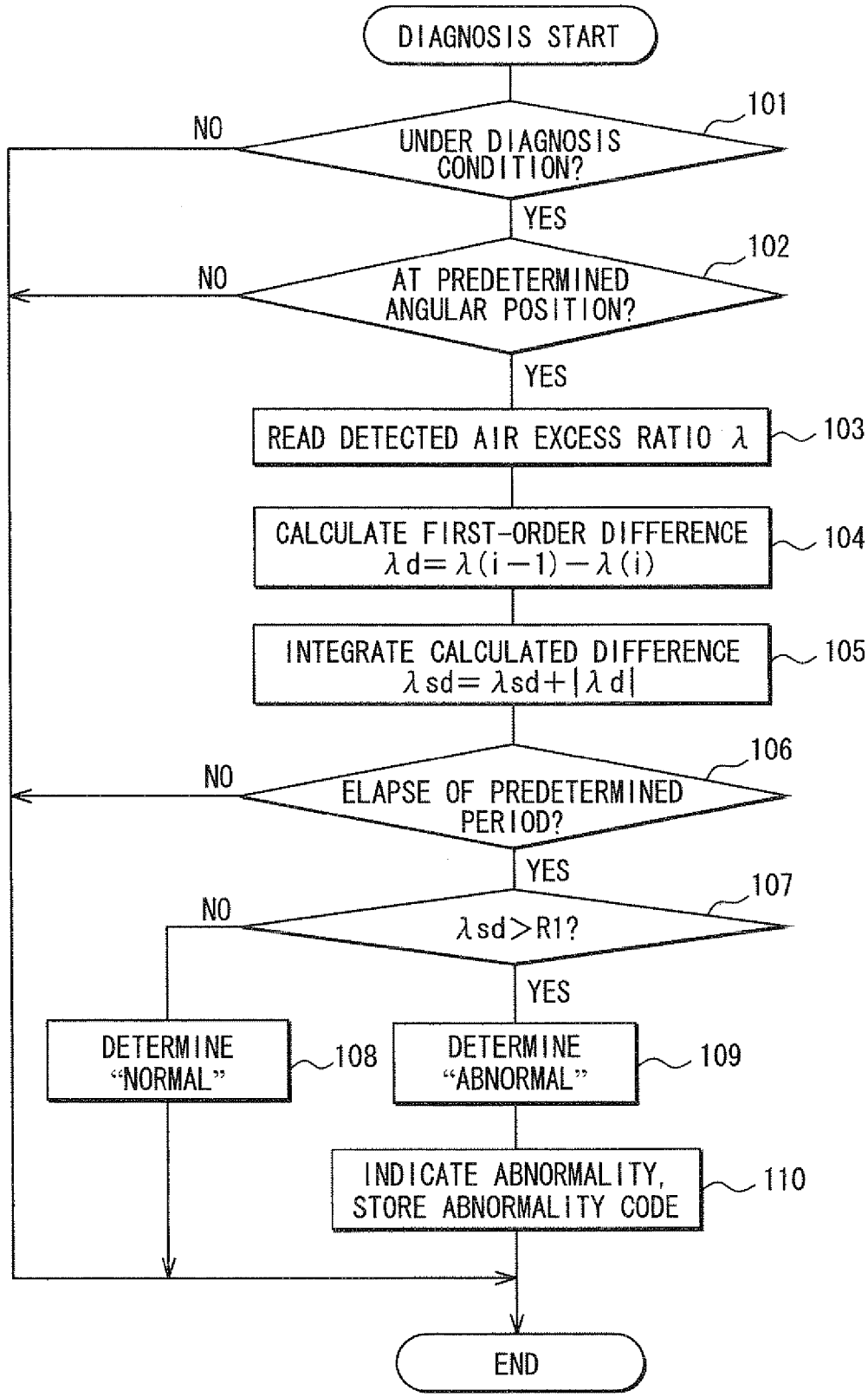
FIG. 4 is a flowchart showing abnormality diagnosing routine executed in the first embodiment.

In the first embodiment, therefore, the ECU 29 executes an abnormality diagnosing routine shown in FIG. 4. This routine may be executed at every predetermined interval while the engine 11 is in operation.

First, at step 101, it is checked whether the engine 11 is in a predetermined abnormality diagnosis condition. This condition may include:

(1) an air-fuel ratio feedback control is stopped;
(2) the engine 11 is operating normally, that is, in a steady state; and
(3) the air-fuel ratio sensor 24 is operating normally.

If any one of the above is not satisfied, this abnormality diagnosing routine is ended. If all of the above requirements are satisfied, it is checked at step 102 whether the crankshaft angular position is at a predetermined position for calculating a first-order difference λd of the air-fuel ratio sensor signal. This predetermined position may be set to a crankshaft angle, at which the ignition spark is generated, or may be variably set in accordance with an engine rotation speed, an intake air quantity, and the like of the engine 11.

If the predetermine position is set variably in accordance with engine operating conditions, the calculation timing of the first-order difference λd can be appropriately changed that the first-order difference λd may be calculated in timed relation to a phase of disorder in the air-fuel ratio sensor, which appears when the air-fuel ratio in any one of the cylinders becomes abnormal. The step 102 may be executed to check whether it is a predetermined time point as an alternative to the predetermined position.

If it is not the predetermined position, this abnormality diagnosing routine is ended. If it is the predetermined position, the air-fuel ratio sensor signal (detected air excess ratio λ) is read at step 103 and a first-order difference λd is calculated as follows at step 104 as a difference between two air excess ratios λ(i-1) and λ(i), which are detected previously and presently, respectively.

$$\lambda d=\lambda(i-1)-\lambda(i)$$

Then, at step 105, the first-order difference λd calculated presently at step 104 is integrated as follows by adding an absolute value of the calculated first-order difference |λd| to a previous integrated value λsd.

$$\lambda sd(i)=\lambda sd(i-1)+|\lambda d|$$

At step 106, it is checked whether a predetermined period for executing step 105 (integration) a plurality of times has elapsed. This predetermined period may be set to correspond to 200 rotations of the crankshaft. If the predetermined period has not yet elapsed, this abnormality diagnosing routine is ended. If the predetermined period has elapsed, the result of integration of the first-order difference λd during the predetermined period, that is, the integrated difference λsd is compared with a predetermined reference value R1 at step 107.

If the integrated value λd is equal to or less than the reference value R1, the air-fuel ratios in all the cylinders are determined as normal (no abnormality) at step 108. If it is more than the reference value R1, the air-fuel ratio in at least one of the cylinders is determined to be abnormal at step 109. In this case, at step 110, this abnormality determination is indicated in a vehicle compartment by flashing a warning light or sounding an alarm, and this abnormality code is stored in a rewritable non-volatile memory such as a RAM backed up by a battery. Thus, the abnormality determination of step 110 can be made by using the air-fuel ratio sensor signal and without using feedback correction factors for individual cylinders or air-fuel ratio information of individual cylinders.

In the first embodiment, if the air-fuel ratio feedback control is continued during the abnormality diagnosing operation, the fuel injection quantity and hence the air-fuel ratio is corrected by the feedback control even when the feedback control is abnormal. Therefore, the accuracy of abnormality diagnosing operation is lowered. For this reason, the above condition (1) is provided at step 101 so that the abnormality diagnosis is performed only when the air-fuel ratio is not feedback-controlled. As a result, the abnormality diagnosis is not influenced by the air-fuel ratio feedback control. Of course, the air-fuel ratio feedback control may be stopped for a period during the abnormality diagnosing operation. Further, the gain of the air-fuel ratio feedback control may be reduced not to influence the diagnosing operation so much while maintaining the air-fuel ratio feedback control to some extent.

Second Embodiment

A quantity of fuel supplied to the engine 11 is changed, when the engine 11 is in a transient condition such as acceleration or a stored evaporating fuel vapor is purged. As a result, the air-fuel ratio sensor signal changes and hence the change rate (first-order difference) of the air-fuel ratio sensor signal also changes. Therefore, in a second embodiment, an abnormality of mixture air-fuel ratio in any one of the multiple cylinders is checked based on a ratio between the integrated change rate (integrated first-order difference λd) of the air-fuel ratio sensor signal (exhaust air-fuel ratio) and an integrated change rate of the air-fuel ratio of mixture supplied to the engine 11 (mixture air-fuel ratio) in a predetermined period.

The change rate of mixture air-fuel ratio is calculated based on a change rate (first-order difference) of the injection correction factor F. This injection correction factor F does not include an air-fuel ratio feedback correction factor. The change rate of mixture air-fuel ratio may alternatively calculated based on a change rate of fuel injection quantity or a change rate of a target air-fuel ratio. It is of course possible to calculate a mixture air-fuel ratio from an intake air quantity and a fuel injection quantity, and then calculate the change rate of the mixture air-fuel ratio.

Figure 5:
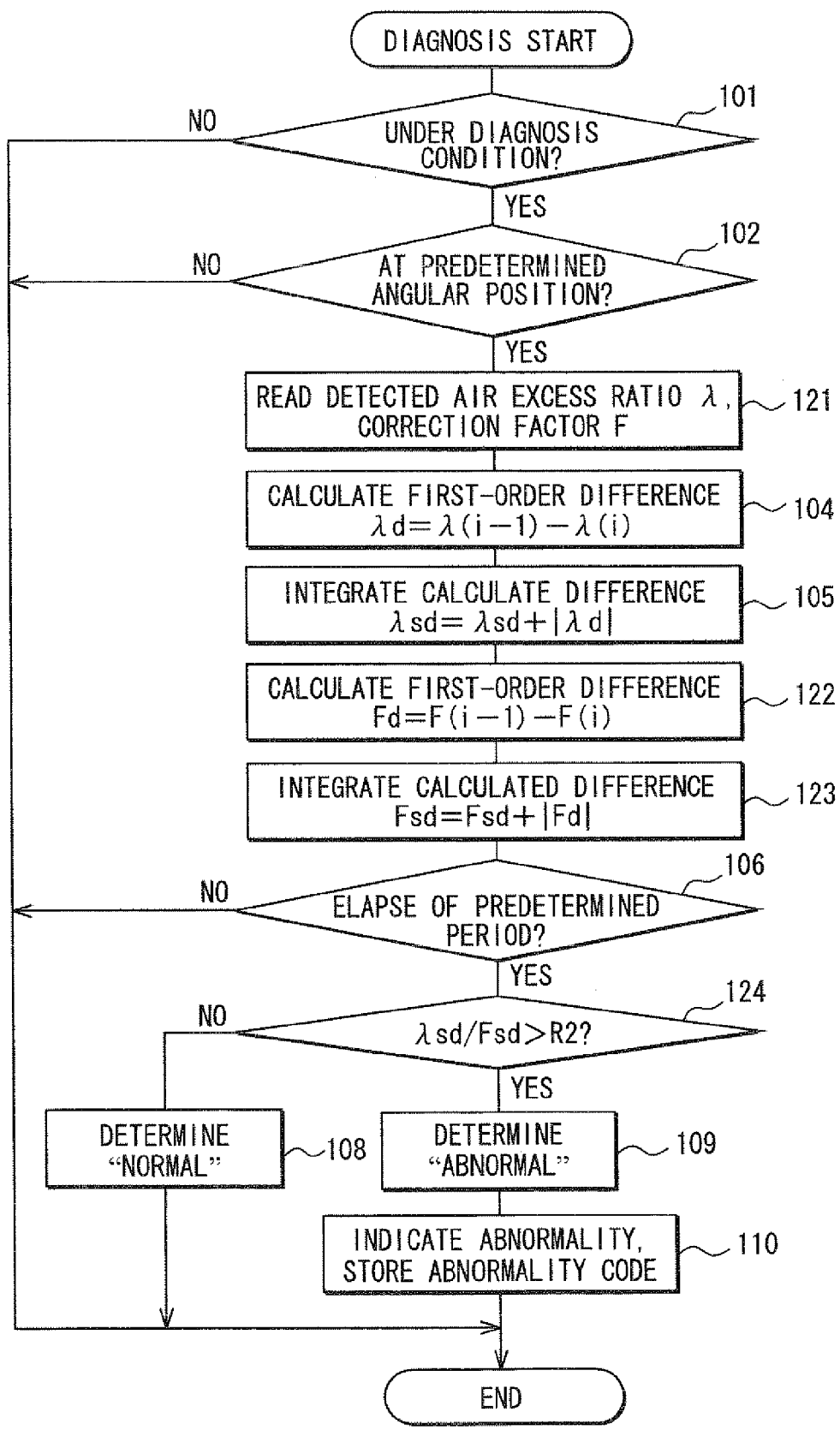
FIG. 5 is a flowchart showing abnormality diagnosing routine executed in a second embodiment of the present invention.

In the second embodiment, as shown in FIG. 5, steps 101, 102 104-106, 108-110 are executed in the same manner as in the first embodiment. When it is determined at step 102 that the engine crankshaft rotates to the predetermined angular position, the injection correction factor F stored in the RAM is read in addition to the air-fuel ratio sensor signal (air excess ratio $\lambda$). If the injection correction factor F includes the feedback control factor, the feedback correction factor is excluded from the injection correction factor F.

After calculating the first-order difference $\lambda d$ at step 104 and the integrated difference $\lambda sd$ at step 105, a first-order difference Fd of the injection correction factor F is calculated as follows at step 122 by using two first-order differences Fd(i-1) and Fd(i) calculated presently and previously, respectively.

$$Fd=F(i)-F(i-1)$$

Then, at step 123, an integrated first-order difference Fsd(i) is calculated as follows by adding an absolute value of the first-order difference |Fd| calculated presently to the previous integrated first-order value Fsd(i-1).

$$Fsd(i)=Fsd(i-1)+|Fd|$$

After the first-order differences $\lambda d$ and Fd are integrated to $\lambda sd$ and Fsd for the predetermined period, a ratio of the integrated difference $\lambda sd$ to the integrated difference Fsd is calculated as $\lambda sd/Fsd$ and compared with a predetermined reference value R2 at step 124. If the calculated ratio $\lambda sd/Fsd$ is not larger than the predetermined reference value R2, no abnormality is determined (step 108). If it is larger than the predetermined reference value R2, abnormality is determined and indicated and stored at steps 109 and 110.

Third Embodiment

Figure 6:
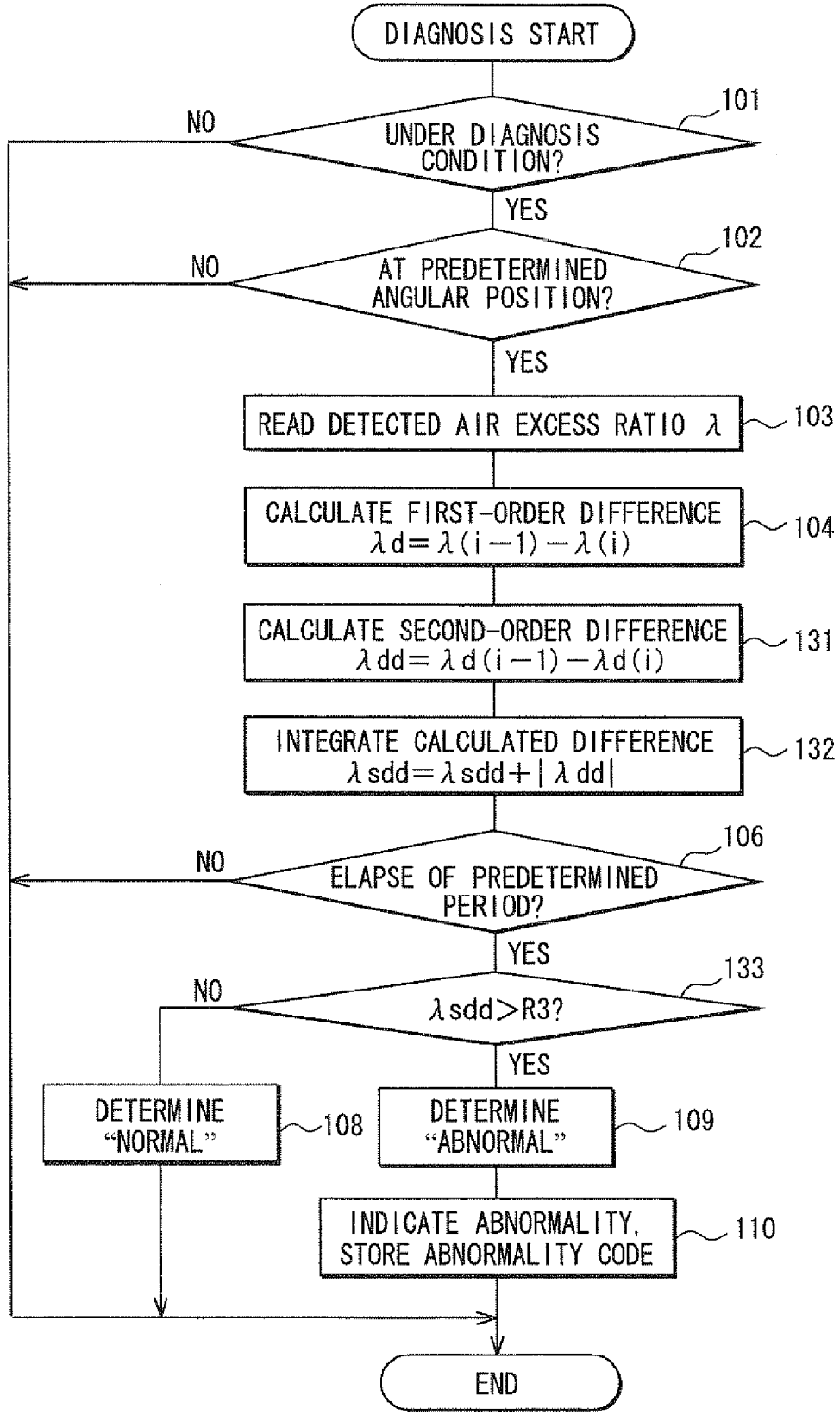
FIG. 6 is a flowchart showing abnormality diagnosing routine executed in a third embodiment of the present invention.

According to a third embodiment, an abnormality is checked based by calculating and integrating a second-order difference of the air-fuel ratio sensor signal (excess air ratio $\lambda$) as shown in FIG. 6. In the diagnosis routine shown in FIG. 6, steps 101-104, 106 and 108-110 are executed in the same manner as in the first embodiment.

After the first-order difference $\lambda d$ is calculated at step 104, a second-order difference $\lambda dd$ is calculated as follows at step 131 by using two first-order differences $\lambda d(i-1)$ and $\lambda d(i)$ calculated presently and previously.

$$\lambda dd=\lambda d(i-1)-\lambda d(i)$$

Then, at step 132, an integrated second-order difference $\lambda sdd$ is calculated as follows by adding an absolute value of the second-order difference $|\lambda dd|$ calculated presently to the previous integrated second-order difference $\lambda sdd$ (i-1).

$$\lambda sdd(i)=\lambda sdd(i-1)+|\lambda dd|$$

After the second-order difference $\lambda dd$ is integrated to the integrated second-order difference $\lambda sdd$ for the predetermined period, the integrated second-order difference $\lambda sdd$ is compared with a predetermined reference value R3 at step 133. If the integrated second-order difference $\lambda sdd$ is not larger than the predetermined reference value R3, no abnormality is determined (step 108). If it is larger than the predetermined reference value R3, abnormality is determined and indicated and stored at steps 109 and 110.

The above embodiments may be modified in many ways. For instance, in the second embodiment, a ratio of an integrated second-order difference $\lambda sdd$ of the air-fuel ratio sensor signal to an integrated second-order difference Fsdd of the injection correction factor may calculated as $\lambda sdd/Fsdd$, and compared with a reference value.

What is claimed is:

1. An engine control apparatus comprising:
   an air-fuel ratio sensor disposed in an exhaust pipe of a multi-cylinder engine for producing a sensor signal indicative of an exhaust air-fuel ratio of exhaust gas of the engine; and
   an electronic control unit for executing a feedback control to control a mixture air-fuel ratio of air-fuel mixture supplied to each cylinder of the engine based on the exhaust air-fuel ratio,
   wherein the control unit includes
   an exhaust ratio change rate integration means for calculating an exhaust air-fuel ratio change rate at every predetermined interval and integrating an absolute value of the exhaust air-fuel ratio change rate, and
   a diagnosis means for diagnosing whether an air-fuel ratio in any one of cylinders of the engine is abnormal based on an integration value of the exhaust air-fuel ratio change rate.

2. The engine control apparatus according to claim 1 wherein:
   the diagnosis means determines that the air-fuel ratio is abnormal when the integration value of the exhaust air-fuel ratio change rate is more than a predetermined reference value.

3. The engine control apparatus according to claim 1, wherein:
   the control unit further includes a mixture ratio change integration means for calculating a mixture air-fuel ratio change rate at every predetermined interval and integrating an absolute value of the mixture air-fuel ratio change rate; and
   the diagnosis means determines that the air-fuel ratio is abnormal based on a ratio between the integration value of the exhaust air-fuel ratio change rate and the integration value of the mixture air-fuel ratio change rate.

4. The engine control apparatus according to claim 3, wherein:
   mixture ratio change rate integration means uses, as the mixture air-fuel ratio change rate, any one of change rates of a fuel injection quantity, a target air-fuel ratio and a fuel injection correction factor.

5. The engine control apparatus according to claim 1, wherein:
   the exhaust air-fuel ratio change rate is a first-order difference or a second-order difference of the exhaust air-fuel ratio.

6. The engine control apparatus according to claim 1, wherein:
   the predetermined interval for calculating the exhaust air-fuel ratio change rate is variable with an operating condition of the engine.

7. The engine control apparatus according to claim 1, wherein:
   the diagnosis means executes a diagnosis operation when the feedback control is stopped.

8. The engine control apparatus according to claim 1, wherein:
   the diagnosis means stops the feedback control during a period of executing a diagnosis operation.

9. The engine control apparatus according to claim 1, wherein:
   the diagnosis means reduces a gain of the feedback control during a period of executing a diagnosis operation.

* * * * *